No. 764,318. Patented July 5, 1904.

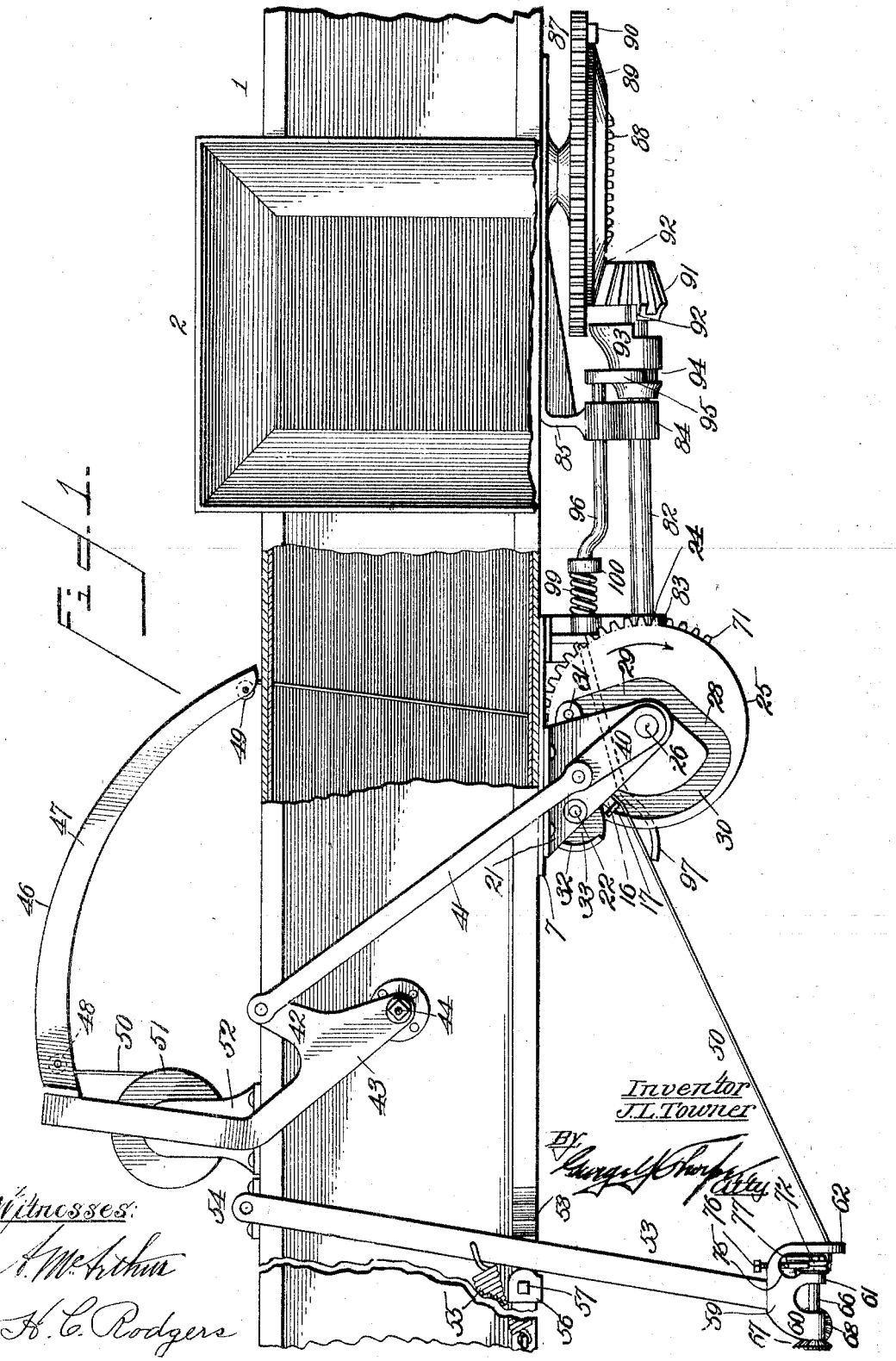

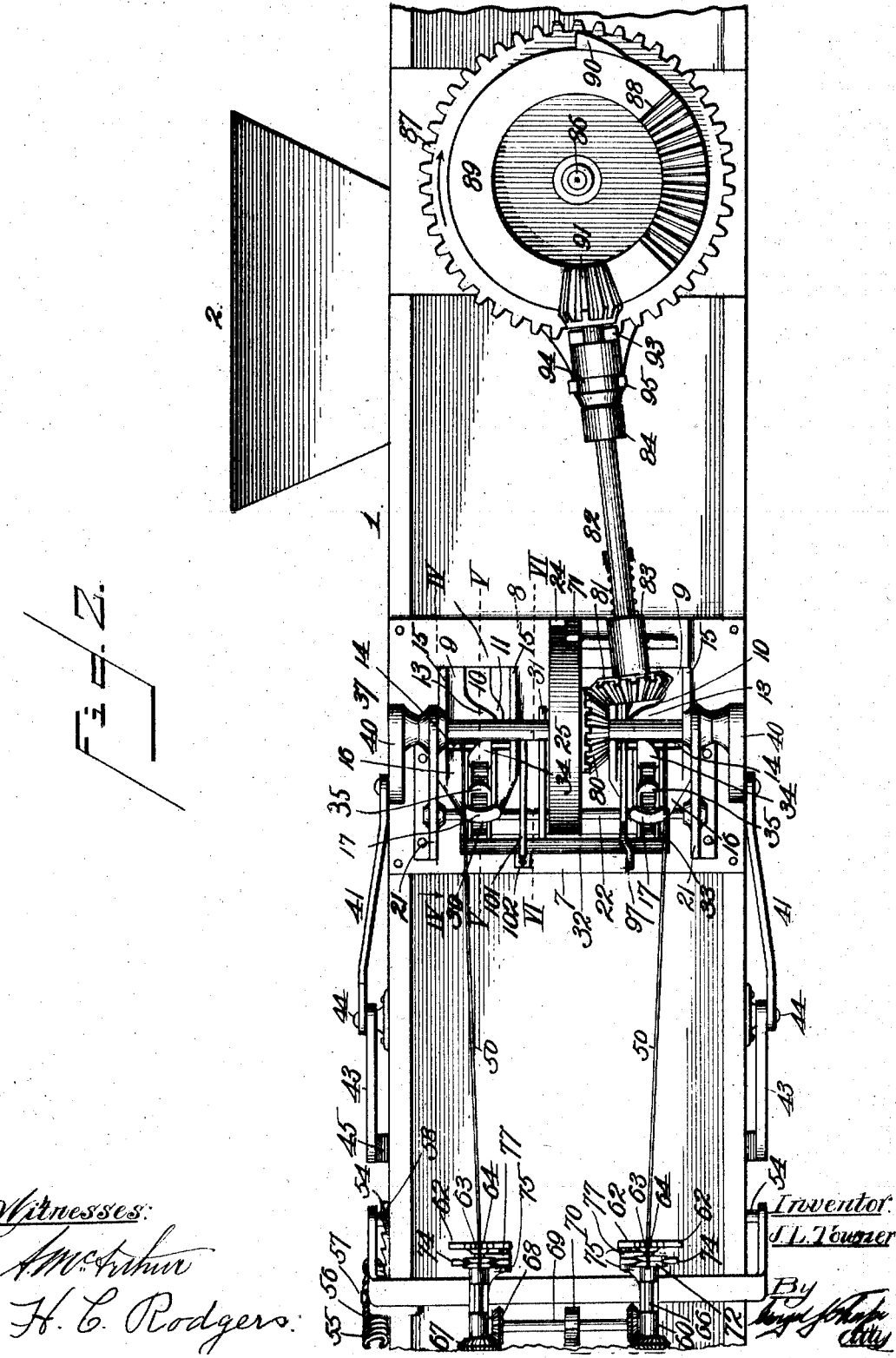

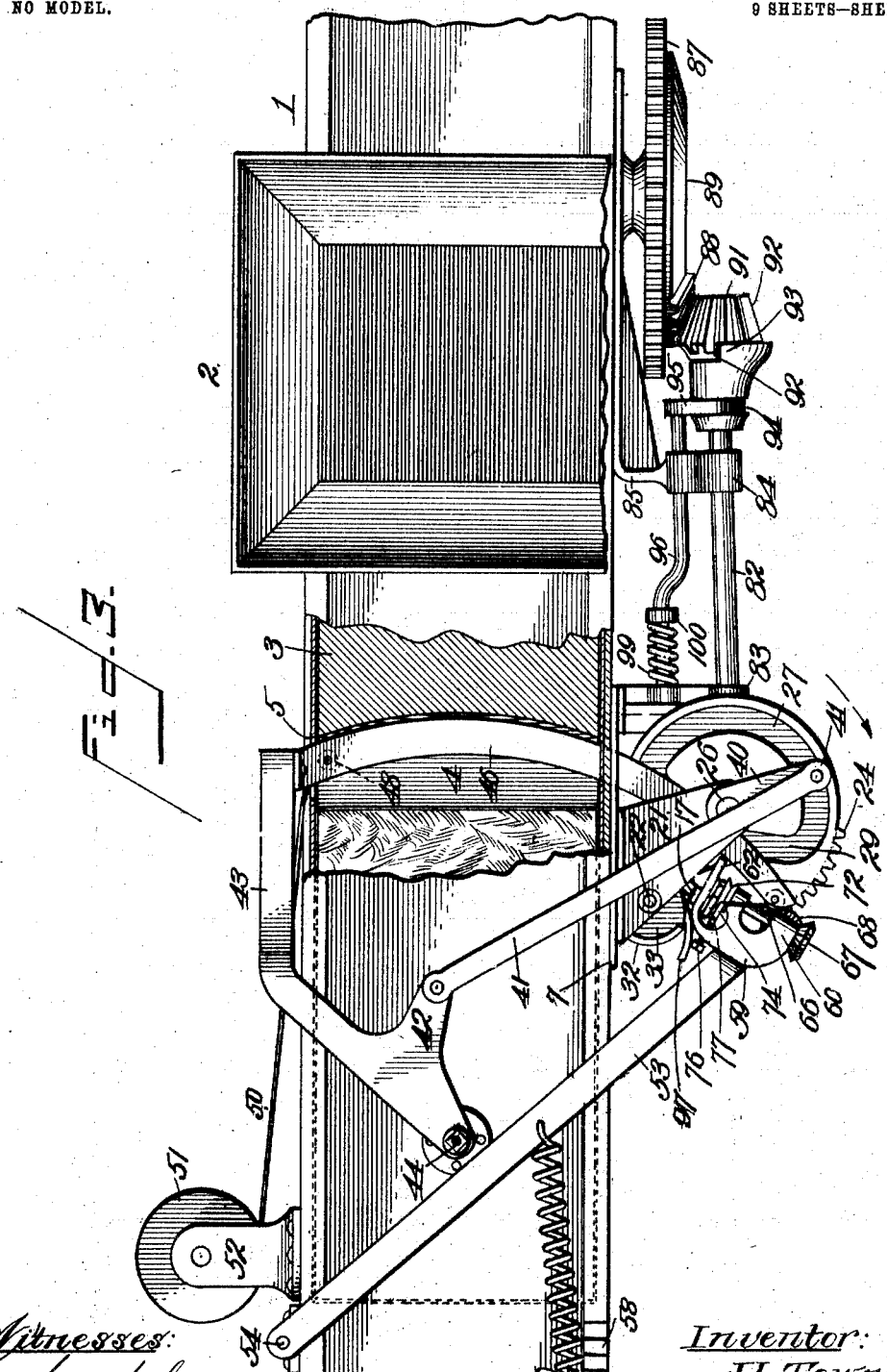

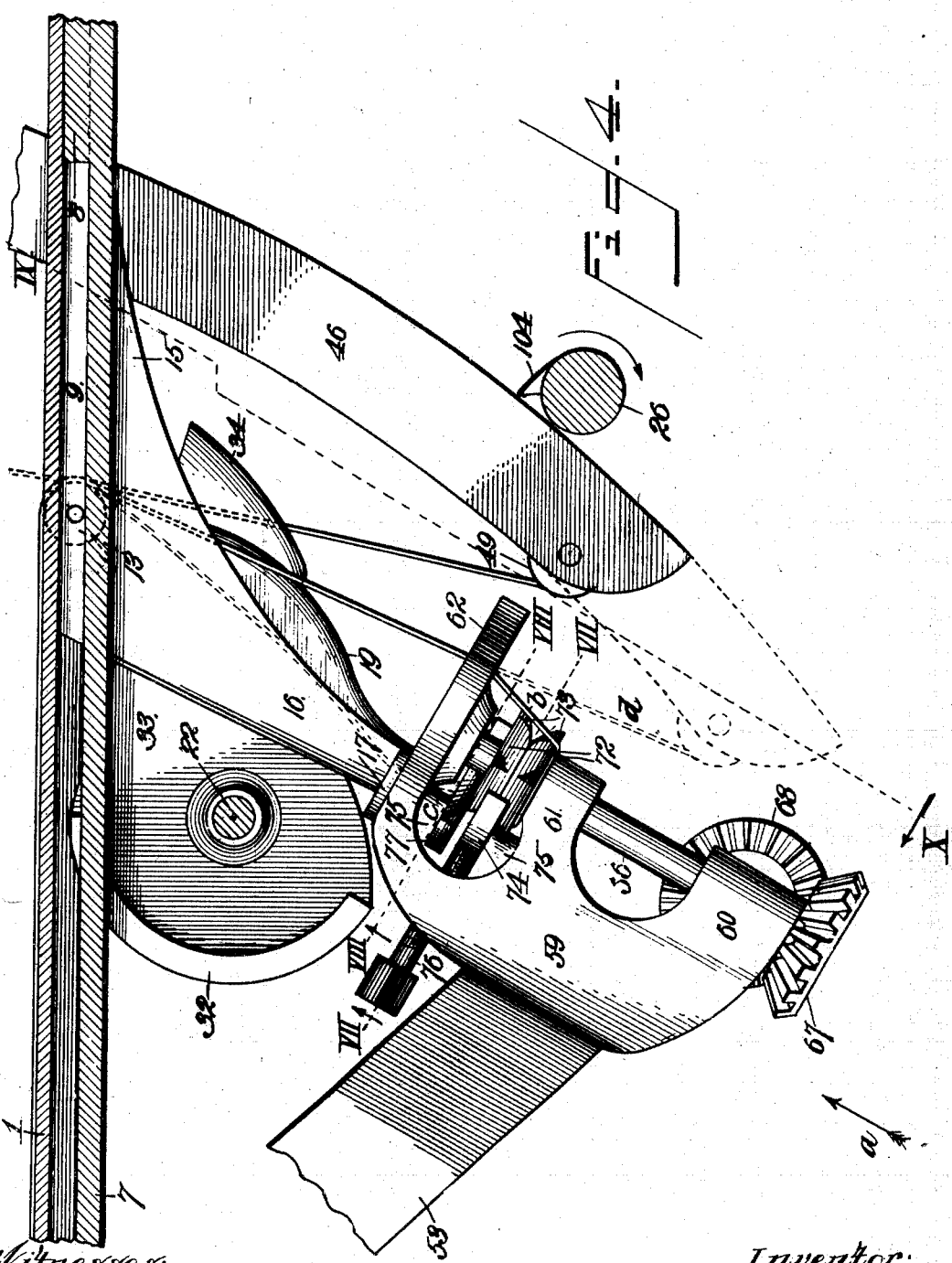

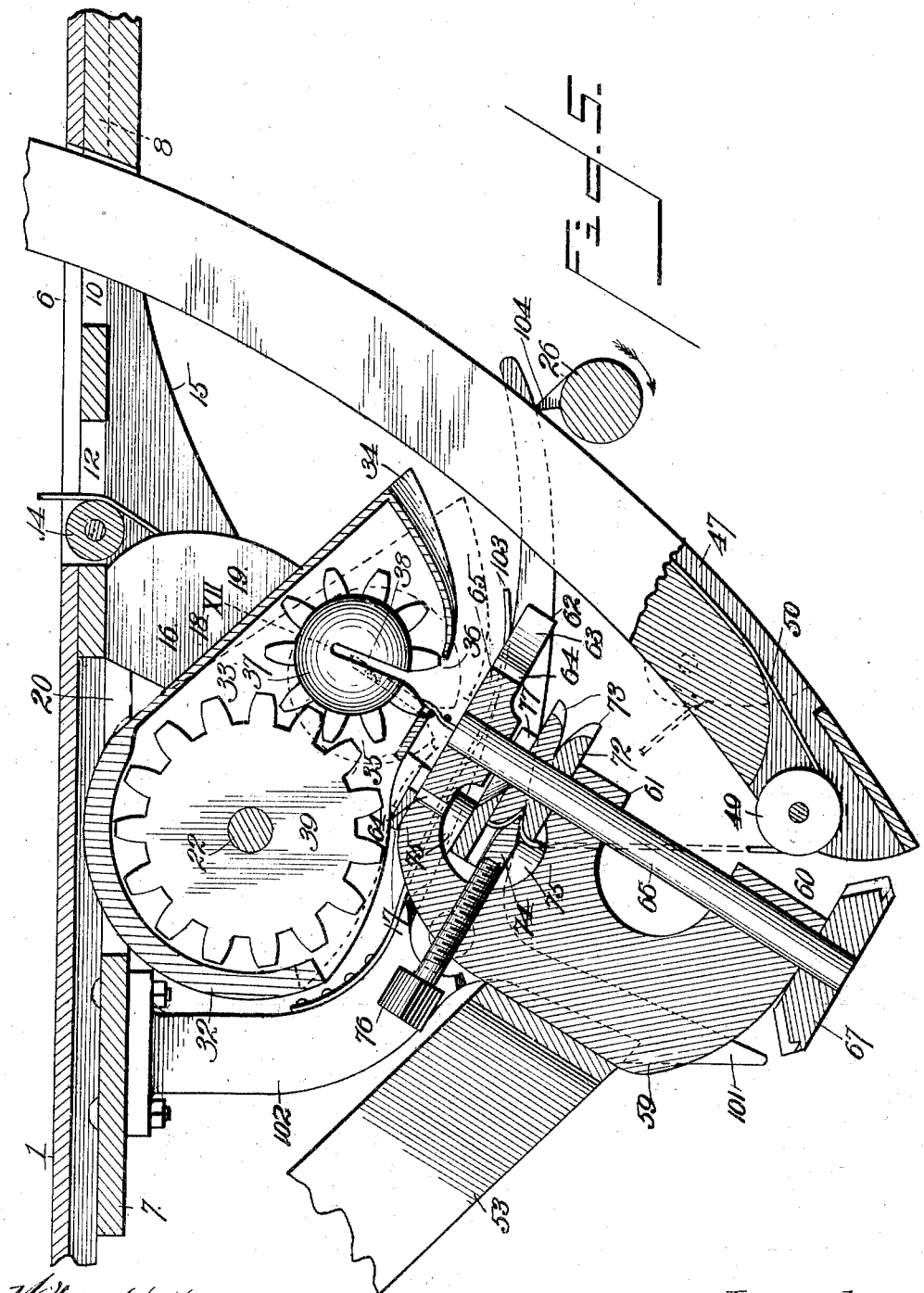

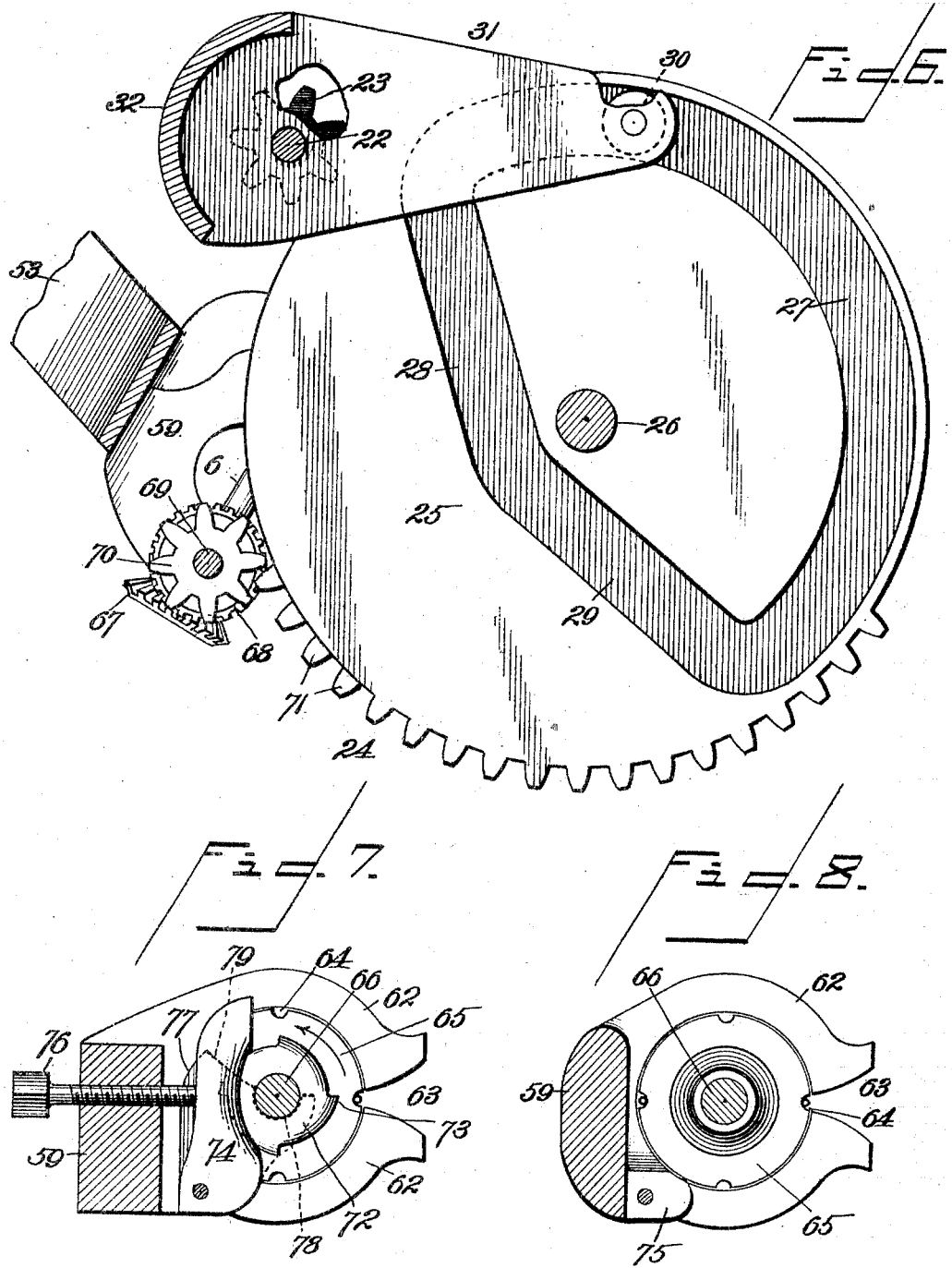

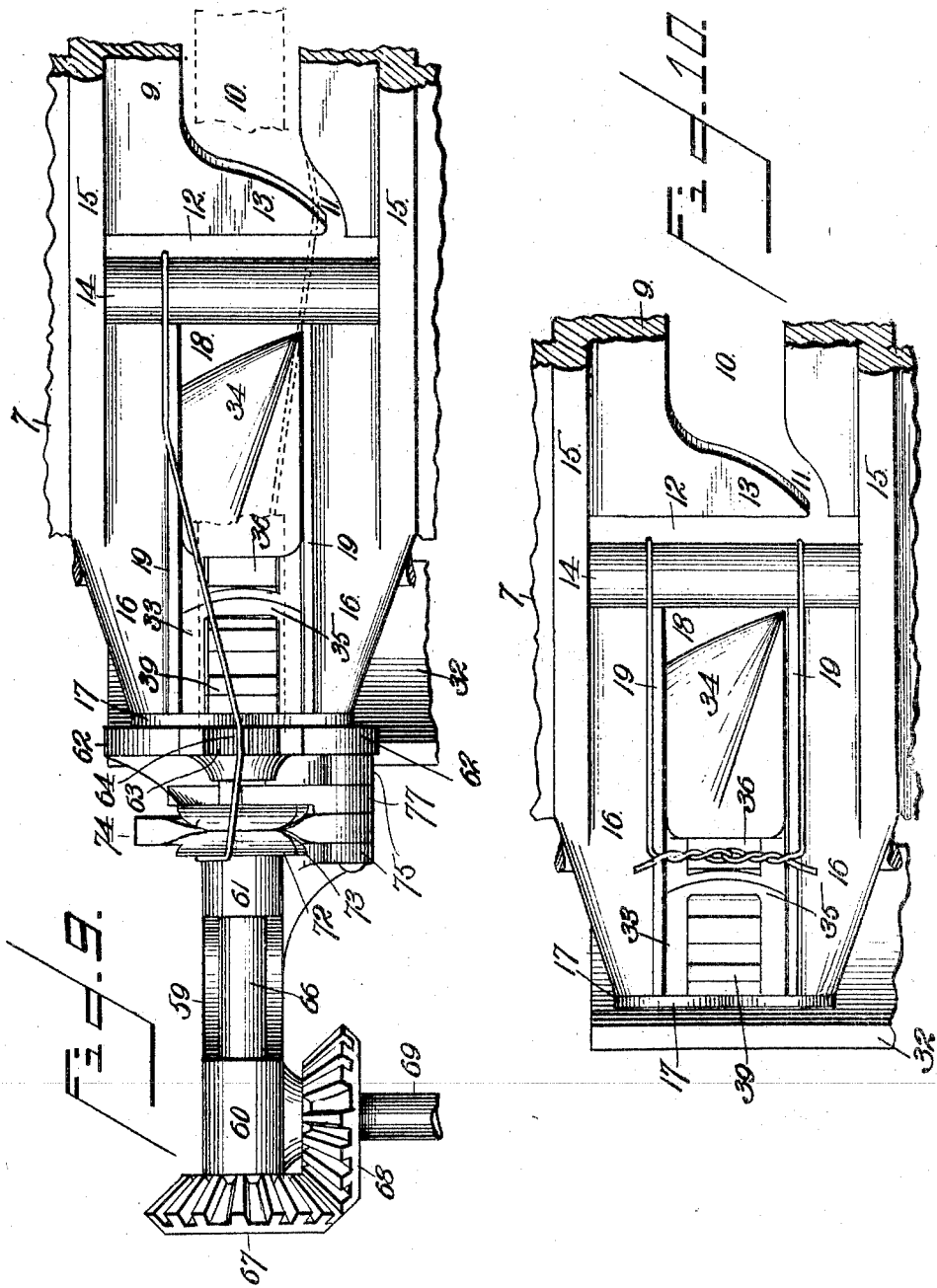

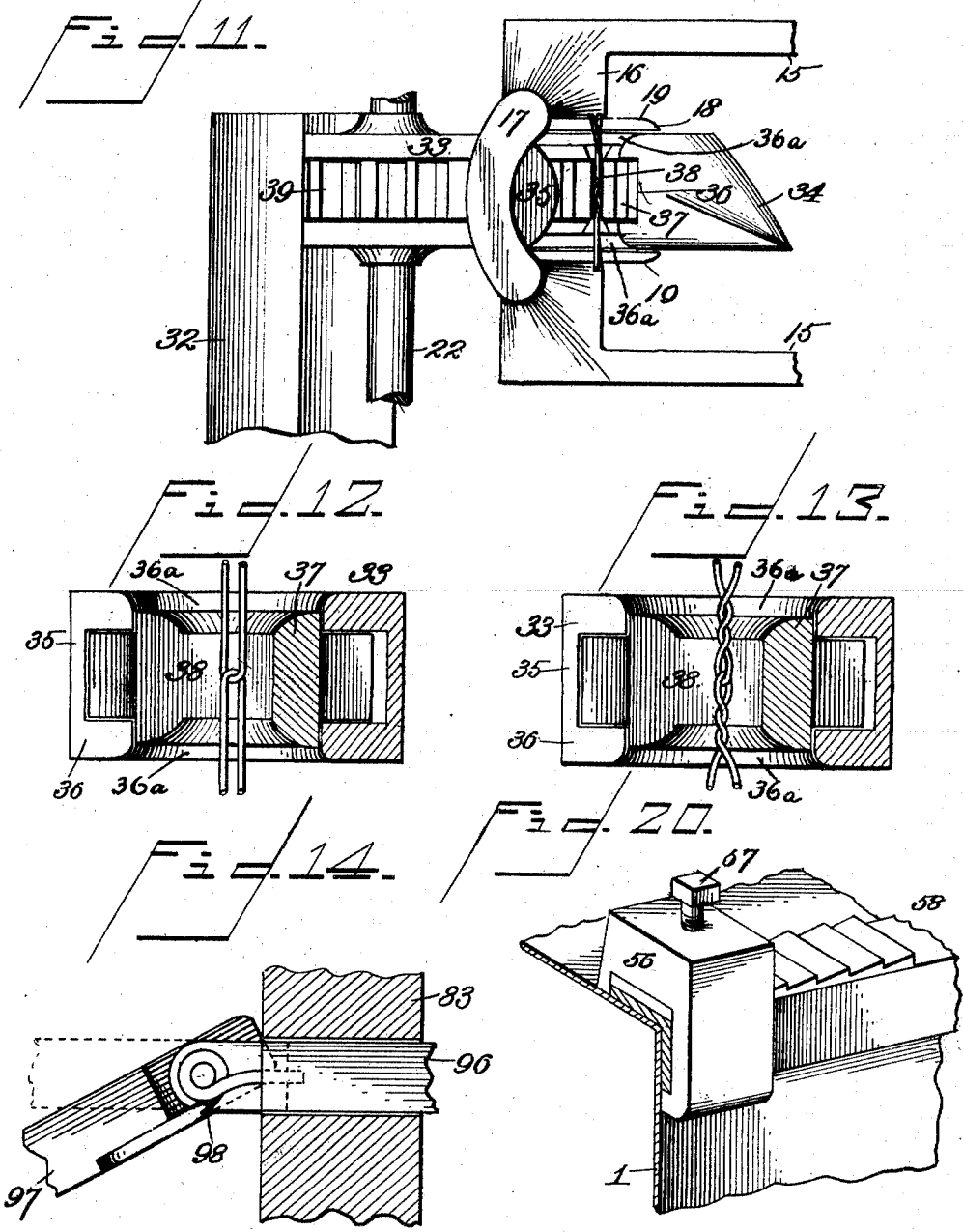

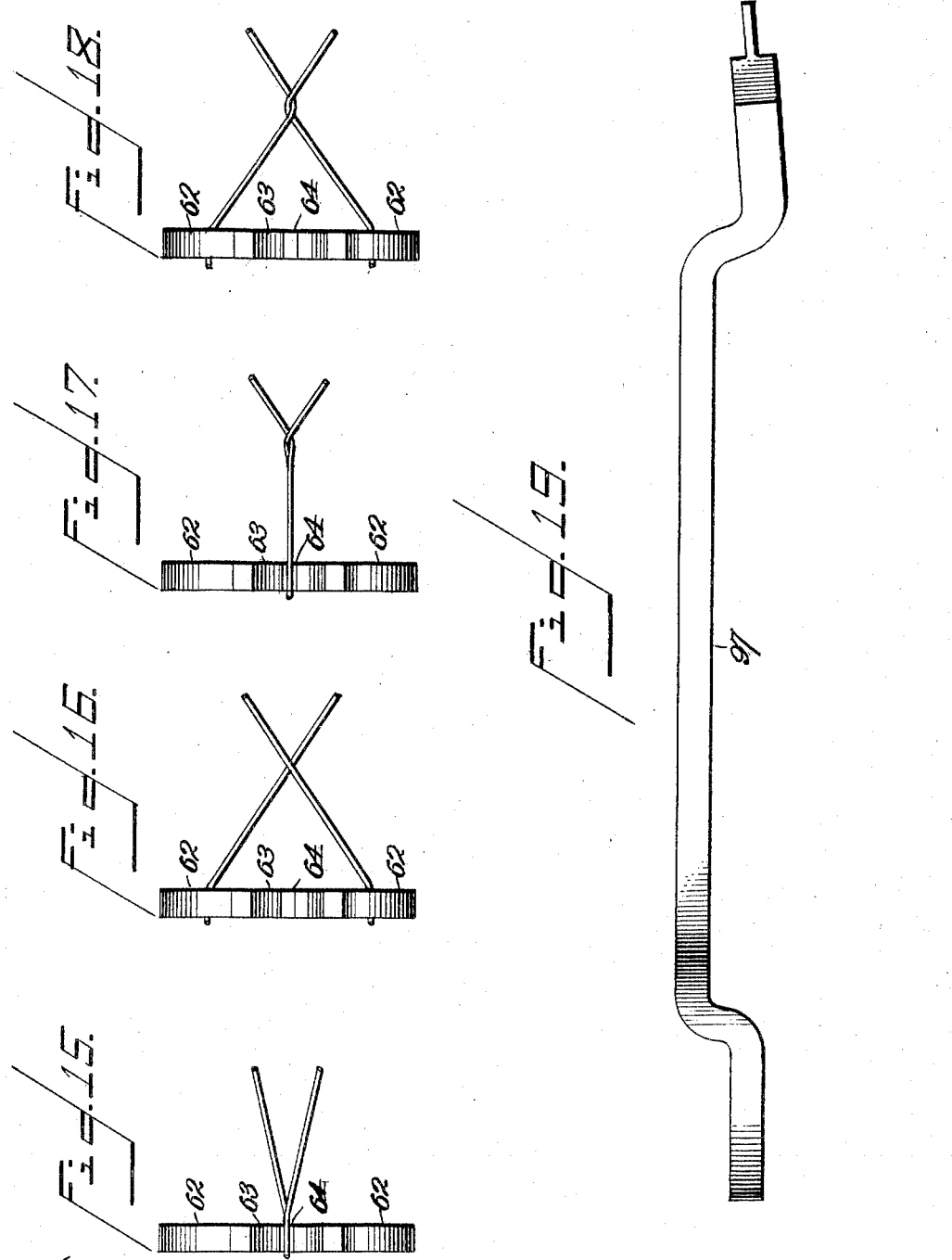

UNITED STATES PATENT OFFICE.

JESSE L. TOWNER, OF VERNON COUNTY, MISSOURI.

BAND-TYING MECHANISM FOR BALING-PRESSES.

SPECIFICATION forming part of Letters Patent No. 764,318, dated July 5, 1904.

Application filed March 11, 1903. Serial No. 147,354. (No model.)

*To all whom it may concern:*

Be it known that I, JESSE L. TOWNER, a citizen of the United States, residing in the county of Vernon and State of Missouri, have invented certain new and useful Improvements in Band-Tying Mechanism for Baling-Presses, of which the following is a specification.

This invention relates to band-tying mechanism for baling-presses of that type employing a reciprocatory plunger to compress the hay or other material, and has for its object to produce a mechanism of the character mentioned which operates efficiently and reliably under any and all conditions.

To this end the invention consists in certain novel and peculiar features of construction and combinations of parts, as hereinafter described and claimed, and in order that it may be fully understood reference is to be had to the accompanying drawings, in which—

Figure 1 represents a top plan view of a portion of a baling-press equipped with band-tying mechanism constructed in accordance with my invention, the parts being arranged in said figure as they appear before the first charge of baling material is acted upon by the plunger. Fig. 2 is a side elevation of the same. Fig. 3 is a top plan view showing the band-tying mechanism as it appears when about to tie the bands around the completed bale, said figure also showing the plunger slotted to receive the laterally-operative needles. Fig. 4 is a horizontal section taken on the line IV IV of Fig. 2, but with the looping and cutting mechanisms disposed contiguous to the knotting mechanism, as in Fig. 3, said Fig. 4 representing the looping and knotting mechanism and the needle just before the latter attains its most advanced position. Fig. 5 is a section taken on the line V V of Fig. 2 with the parts disposed in the position they occupy just after the ends of the wire have been looped together. Fig. 6 is a horizontal section taken on the line VI VI of Fig. 2 with the parts disposed in the positions they occupy just prior to the operation of the looping mechanism and before the needle has attained its most advanced position. Fig. 7 is a section on the line VII VII of Fig. 4. Fig. 8 is a section on the line VIII VIII of Fig. 4. Fig. 9 is a sectional view taken substantially on the line IX X of Fig. 4, the needle and the contiguous portion of the wire being shown in dotted lines with the former partially broken away. Fig. 10 is a similar view except that the looping mechanism and needle is entirely omitted and the ends of the wire are shown as knotted together and about to be released by the knotting mechanism. Fig. 11 represents the knotting mechanism for the upper wire of the bale as viewed in the direction indicated by the arrow *a* in Fig. 4. Fig. 12 is a cross-section of the knotting mechanism, taken on the dotted line XII of Fig. 5 just prior to the twisting operation. Fig. 13 is a similar view subsequent to the twisting operation. Fig. 14 is an enlarged horizontal section showing the break-joint connection between the clutch-rod and its extension. Figs. 15, 16, 17, and 18 represent edge views of the looping mechanism in various stages of the looping operation. Fig. 19 is an enlarged side view of the clutch-rod extension. Fig. 20 is a sectional perspective of the case and shows the adjustable stop for the wire-holding frame.

Referring now to the drawings in detail, where like reference-numerals designate corresponding parts, 1 designates the baling-case of a steam or horse power baling-machine of any suitable or preferred type, the same being provided at its upper side with the feed-hopper 2 and with a reciprocatory plunger 3, said plunger having two transverse slots 4 in its rear end through which the needles (hereinafter described) can freely pass, but into which it will be practically impossible for enough hay to enter to interfere with the operation of the needles. At its opposite sides the baling-case is provided with holes 5 and 6, with which said plunger-slots register when the plunger attains its most advanced position—*i. e.*, when it completes the formation of a bale. Secured externally to the side of the baling-case containing openings 6, there being of course an opening 6 for each slot 4, is a metallic plate 7, said plate at its front edge being provided with a vertical rib 8, which, in effect, increases the thickness of the plate and causes it to bear at such point squarely against the side of the case to strengthen the latter, the rib terminating at its upper and lower ends at the lower and upper margins, respectively, of the corner angle-irons customarily found on baling-presses. The plate 7 is formed with two substantially rectangular depressed portions 9, which also bear against and strengthen the baling-case and are provided with needle-openings 10, registering with openings 6 of the case, the upper opening 10 tapering downwardly and rearwardly, so as to form a curved slot 11, which communicates with the lower end of a vertical opening 12, the depending portion 13 thus left between said openings and slot forming a guide-finger for a purpose which hereinafter appears. The lower opening 10 is precisely similar to the upper one, except that it tapers upwardly and rearwardly to form a curved slot 11, which communicates with the upper end of a vertical opening 12, and in this case the portion 13 left intact between said openings and slot forms an upwardly-projecting guide-finger 13, said parts being correspondingly numbered, because they are identical in function, one operating with the upper and the other with the lower tie-wire of the blade. Suitably mounted near the rear sides of openings 12 and 6 are vertical antifriction-rollers 14, over which the wires run when being drawn off the reels by the accumulating hay or other baling material and when being inserted by the needle into the looping mechanism and until the knotted wire has been released and has been drawn tightly around the bale by the expansive action of the latter. At the upper and lower ends of each opening 12 and roller 14 the plate is provided with horizontal ribs 15, each pair of which merge into an outwardly-tapering and rearwardly-projecting arm 16, having its outer end 17 presenting a square flat surface. Each arm 16 is provided with a longitudinal slot 18, disposed horizontally, and with horizontal flanges 19, which project forwardly of the arm at the upper and lower margins of said slot, with their upper corners rounded, as shown most clearly in Fig. 11, for a purpose which hereinafter appears, and rearward of arms 16 plate 7 is provided with openings 20.

In planes just above and below the topmost and undermost ribs 15 horizontally-disposed angle-brackets 21 are bolted to plate 7 and form bearings for the vertical shaft 22, equipped with a small gear-wheel 23, adapted to be operated by the upper series of peripheral teeth 24 of the large wheel 25, secured upon a vertical shaft 26, also journaled in brackets 21. Said wheel is provided in its upper side with a cam-groove comprising a semicircular portion 27, concentric of the wheel's axis, and substantially straight portions 28 29, which communicate at the opposite side of and contiguous to the wheel's axis and diverging therefrom at equal angles communicate at their opposite ends with said semicircular portion. Engaging said cam-groove is an antifriction-roller 30, pendent from the horizontal arm 31 of the vertically-disposed rock-frame 32, which terminates at each end in the plane of slots 18 in a casing 33, projecting into openings 20 of plate 7, said openings being provided simply to permit of a more compact construction. The casings project forwardly through and are adapted to oscillate in slots 18 and terminate at their front ends in horns or noses 34, having their points in the plane of their lowest and highest sides, respectively, for a purpose which hereinafter appears. The outer sides of the horns or noses of said casings terminate a suitable distance forward of the vertical bridge-bars 35, connecting the upper and lower sides of the casings in order to form slots 36, wherein the looped ends of the wires hereinafter referred to may enter and from which such ends shall emerge when twisted or knotted together, said slots registering with circular openings $36^a$ in the top and bottom walls of the casings.

37 is a small cog-wheel having its hub journaled in the openings $36^a$ of each casing and provided with a radial slot 38, opening out between two of its teeth, and 39 a larger intermeshing cog-wheel mounted rigidly on shaft 22 within the casing and so proportioned with relation to the slotted wheel that the latter makes three complete revolutions to two revolutions of the former, the relation between wheel 23 and teeth 24 being such that each revolution of wheel 25 is attended by two complete revolutions of wheel 23, and therefore by three revolutions of the slotted wheel.

Mounted rigidly on each end of shaft 26 is a crank-arm 40, pivotally connected by links 41 above and below the baling-case to the arms 42 of a swinging frame, said frame consisting of a pair of obtuse-angle arms 43 above and below the baling-case and fulcrumed on the casing, as at 44, concentrically of the openings 5 and 6 of the baling-case, the outer ends of said arms being united by the vertical portion 45. Secured to the free end of said swinging frame and curving concentrically of axial point 44 is a pair of needles 46, one for the upper and the other for the lower wire of the bale, each needle (one only being shown) being provided in its outer side with a groove 47 and at the opposite ends of said groove with guide-rollers 48 and 49, the wires 50 extending from reels 51 (one only of which appears) around the rear rollers 48 of the needles, thence through said grooves and over the other rollers 49, said reels being frictionally journaled in a bracket 52, bolted or otherwise secured to the contiguous side of the baling-case.

53 designates a U-shaped frame arranged horizontally, with its bridge portion at the opposite side of the baling-case from the reels and its arms pivoted to the case contiguous to and rearward of said reels by preference, as at 54. A retractile spring 55 or its equivalent, connected at its opposite ends to the baling-case and to the swinging frame 53, tends to hold the latter at its rearmost limit of movement, such movement being limited by the sliding angle-stop 56, equipped with a set-screw 57 to engage one of the upwardly-disposed teeth 58 of a ratchet-plate secured upon the baling-case. At the free end of said swinging frame 53 is secured a pair of horizontally-arranged brackets 59, each formed with bearing-arms 60 and 61 and with a pair of superposed arms 62, which conjointly form a circular opening, the contiguous ends of said arms being beveled to form an outwardly-flaring mouth 63 for said opening. Said mouth registers with the successively-presented peripheral notches 64 of a disk 65, fitting snugly between the arms 62 and mounted rigidly upon one end of the shaft 66, journaled in bearing-arms 60 61, the opposite end of said shaft carrying rigidly a bevel-gear 67.

68 designates similar bevel gear-wheels meshing with gears 67 and mounted rigidly upon the opposite ends of the vertical shaft 69, journaled at its upper and lower ends in bearing-arms 60 and equipped with a cog-wheel 70, adapted to be operated once in each revolution of wheel 25 by the lower series of peripheral cog-teeth 71 (see Figs. 1, 2, and 6) of said wheel, said teeth being adapted to impart one and one-fourth revolutions to the peripherally-notched disks 65 through the gear described before the teeth 24 engage and operate cog-wheel 23, hereinbefore referred to.

The clamping mechanism having for its chief function the holding of the end of the wire and also assisting in the looping operation is constructed as follows:

72 designates a pair of disks rigidly secured upon each shaft 66 between bearing 61 and disk 65 and curved at their proximate sides so as to form therebetween an annular channel wedge-shape in cross-section, each disk 72 being provided peripherally with ratchet-teeth 73 opposite the notches 64 of disk 75 and having their abrupt faces disposed in the direction in which the disks rotate, said direction being indicated by the arrow, Fig. 7. 74 is a vertical clamping-wedge registering with said wedge-shaped channel at the opposite side of the shaft from mouth 63 and pivoted at its lower end between depending lugs 75 of the bracket, so as to be capable of movement to accommodate the wire as forced by the teeth 73 between the disk 72 and the wedge-clamp, said clamping-wedge being adjusted to and held in the desired position by means of a set-screw 76, mounted in the bracket 59, as shown clearly in the drawings.

77 is a knife or cutter secured between the disks 72 and the lug 75 contiguous to arms 62 and held against pivotal movement by the engagement of its notch 78 with the lower half of shaft 66, the cutting edge 79 of the knife bearing against the flat side of the proximate disk 72 and intersecting the periphery of said disk, as shown clearly in full lines in Fig. 4 and Fig. 9 and by dotted lines in Fig. 7.

Shaft 26 is provided below wheel 25 by preference with a bevel-gear 80, meshing with a bevel-gear 81 on a shaft 82, journaled near its rear end in a bearing 83, secured to plate 7, and near its front end in a bearing-arm 84 of the casting or plate 85, secured to the contiguous side of the press. Said casting is provided with a stub-shaft 86, upon which is journaled a large cog-wheel 87 or its equivalent, adapted to be driven by any suitable gearing at such a speed that it shall cause the needles to reciprocate transversely through the grooves of the plunger while the latter is advanced and in the interim between the beginning and end of such movement cause the disks 65 to loop, the knife to cut, and the wheels 37 to knot the wires in a manner hereinafter explained.

Secured to or cast with cog-wheel 87 is a mutilated gear-wheel, the same comprising a series of teeth 88, covering about one-fourth of the face of said wheel, and a long tooth 89 covering the remaining surface of the wheel, and said wheel is furthermore provided with a peripheral cam 90, for a purpose which hereinafter appears.

A small bevel-wheel mounted loosely on the front end of shaft 82 comprises a series of teeth 91 and a long tooth 92 and is of such proportion and arrangement that teeth 88 in passing shall impart to it one revolution and leave its long tooth engaging the long tooth 89, so that during three-fourths of each revolution of the latter said small wheel shall remain inactive. The small mutilated gear-wheel is provided with a shoulder 92, so as to form one member of a clutch, adapted at times to be engaged by the clutch member 93, mounted to slide but not rotate on shaft 82 in the customary manner. Clutch member 93 is provided with an annular groove 94, engaged by the customary fork 95, mounted upon the front end of the slide-rod 96, supported in bearing-arm 84, and in bearing 83, hereinbefore described. This rod 96 is provided with a pivoted extension 97 rearward of bearing 83 and with a spring 98, coiled upon the pivot and engaging rod 96 at one end and the extension 97 at the other and tending to break the joint and hold the extension at an angle to the rod, (see Fig. 14,) so that spring 99, coiled around rod 96 and bearing at its opposite ends against bearing 83, and collar 100 on the rod shall be prevented from sliding said rod 96 forwardly through the bearing, except when the lower bracket 59 of swinging frame 53 shall strike the rear end of the extension 97 and swing the latter into longitudinal alinement with rod 96. When this occurs, the spring 99 immediately advances rod 96 and effects the engagement of the clutch members just prior to the engagement of teeth 88 with the small mutilated gear, as hereinafter more specifically explained.

Before proceeding with the description of the operation it should be stated that the parts are disposed substantially in the positions shown in Figs. 1 and 2, with the wires from guide-rollers 49 of the needles extending through openings 5 across the baling-chamber in the path of the bale to be formed, thence through openings 6 of the baling-case and the registering openings 12 of plate 7 around rollers 14 and against the outer or front sides of the tapering arms 16, the upper wire being above the upper flange 19 of the upper arm 16 and the lower wire below the bottom flange 19 of the lower arm 16. From said arms the wires extend rearwardly and outwardly in substantially horizontal planes and through the disk-notches 64 registering with the flaring mouths 63. From said notches the wires extend, as shown most clearly in full lines, Fig. 4, to the clamping-disks 72 just above the teeth 73 thereof, which occupy substantially the same horizontal planes as same flaring mouths 63. The wires then extend across the outer faces of the outermost disk of each pair above and below, respectively, the contiguous bearing-arms 61 and are kinked and held tightly in the wedge-shaped grooves between the disks 72 by the clamping-wedges 74, these wedges holding the ends of the wires so tightly that when the frame 53 swings back to the position shown in Figs. 1 and 2 it shall draw the wire with it, the reels unwinding to accommodate this movement. The hay being now fed into the baling-case through the hopper in the customary manner, the plunger 21 forces it rearwardly in the baling-chamber and against those portions of the wires extending from the points of the needles across the baling-chamber and through the openings 12 in the opposite wall, as hereinbefore explained, this action simultaneously drawing wire through the needles from the reels at one side and from the wire-holding frame at the other, spring 55 yielding to permit the frame to advance and supply such wire. This double-wire feed—*i. e.*, from the reels and frame—occurs because the friction of the wire on the end and corners (where it is bent) of the bale offers greater resistance to wire movement than the reels or the frame. Furthermore, the fact that the frame and reels oppose each other tends to hold the intermediate portion of the wire stationary, though in this connection it should be stated that the retractile power of the spring is sufficient to overcome the resistance of the reels. As the bale increases in size under the successive charges in which the hay is introduced through the hopper and under repeated strokes of the plunger, its pressure against said wires eventually disposes the frame-brackets 59 against the end portions 17 of the arms 16 of plate 7, said frame in such movement forcing out of its path (see Fig. 5) the spring-pressed dog 101, pivoted on bracket 102, secured to plate 7, said dog immediately returning to its original position under the pressure of its spring 103 after the passage of and locking said frame against ends 17 until the loop has been formed and engaged by the knotting mechanism. As the swinging frame is thus locked one of its brackets trips the clutch-rod extension 97 by striking the outer side of the same and swings it inward against the resistance of spring 98 until said extension is alined with the rod, when immediately spring 99 by pressure against bearing 83 and collar 100 moves the rod forwardly and forces the clutch member 93 into engagement with the clutch member 92. Immediately this takes place the mutilated-gear-wheel teeth 88, traveling in the direction indicated by the arrow, Fig. 2, engage the small mutilated gear 91 and impart to the latter one full revolution, this action being accompanied through the medium of shaft 82 and gear-wheels 81 80 by a full revolution of wheel 25. As said wheel 25 rotates in the direction indicated by the arrow, Fig. 1, it effects the advance of the needles transversely through the baling-case and through the alined slots 4 of the at this moment advanced plunger, the plunger by engagement with the bale permitting the needles to operate without interference on the part of the hay and draw the wire through slots 4 against the end of the bale, Fig. 3.. During the latter part of the advance of the needles and by the time their points have attained the position shown in full lines, Fig. 4, teeth 24 of wheel 25 by engagement with wheel 70 have rotated disks 65 one-half a revolution, so as to swing the ends of the upper and lower wires clamped by the wedges 74 between disks 72 from the position shown in full lines *b* to the position shown in dotted lines *c* of Fig. 4—*i. e.*, one-half a revolution—so as to dispose said ends of the wires diametrically opposite the flaring mouths 63, the upper wire swinging above the contiguous arm 61 and the lower wire below its contiguous arm 61, as will be readily understood. As the half-revolutions of notched disks 65 are completed the needles about attain their innermost limits of movement and introduce the portions of their wires contiguous to rollers 49 through flaring mouths 63 and into the registering-disk notches 64, as shown by full lines, Fig. 8, and by dotted lines *d*, Fig. 4, so that the two portions of the wires at this time shall occupy diametrically opposite notches 64 of said disks. The wires are thus disposed by the needles in order that the disks without interruption shall continue to rotate until one and one-fourth revolutions have been made, there being sufficient teeth 24 to effect this result. Before explaining how the wire is looped by the continued rotation of said disks it is necessary to explain the disposition of that portion of the wires leading from the opposite side of the bale to the needle-rollers 49. These portions of the wires in the advance of the needles hereinbefore mentioned are brought across the end of the bale, and as the points of the needles pass through the openings 10 of plate 7 the contiguous portions of the upper and lower wires are respectively deflected by guide-fingers 13 downwardly (see Fig. 9) and upwardly through the upper and lower slots 11, so that said wires as they emerge into openings 12 shall respectively underlie and overlie horns or noses 34 of the rock-frame casings 33, extending thence at the time the needles have attained the position shown in dotted lines, Fig. 4 and Fig. 9, and full lines, Fig. 5, through the disk-notches 64 just in the act of passing the flaring mouths 63, as hereinbefore stated. It will thus be seen that at the end of the first half-revolution of said disks 65 the portions of the wires between said disks and the baling-case which extends through diametrically opposite notches 64, as shown by $b$ and $c$, Fig. 4, diverge toward the case when looked at from the same point of view as Fig. 9, as shown in Fig. 15, one portion of the upper wire being above the top flange 19, rounded as described to compel the wire to slide up to such position and the other disposed by guide-finger 13, so as to be forced below the companion flange 19 of arm 16 in a manner hereinafter explained. The lower portion of the bottom wire is likewise below the bottom flange of lower arm 16 and the other portion of said wire disposed by the upwardly-projecting finger 13, so as to be forced above the companion flange 19, and in this connection it will be noticed by reference particularly to Figs. 4, 5, 7, and 9 that after the disks have made the one half-revolution mentioned the wires at points contiguous to where they are pinched by the wedge-clamps lightly engage the edges of the knives or cutters 77 to be severed thereby during the next quarter-revolution, the same quarter-revolution carrying the contiguous portion of the wire—$i. e.$, portion $d$, Fig. 4—into engagement with the clamping-wedge, (see Fig. 5,) as the severed end as waste is carried down by the wheels away from the wedge-clamp and drops upon the ground. This third quarter-revolution results in disposing the contiguous portions of the wires—$i. e.$, those portions inward of disks 65—as shown in Fig. 16, the fourth quarter, as shown in Fig. 17, and the fifth quarter, as shown in Fig. 18, in which figure it will be seen that the portions of the wire contiguous to the front faces of the disks are looped together, it being understood that the fourth quarter-revolution resulted in severing portion $d$ in a manner similar to that described, so as to leave two bands totally disconnected from the reels around the bale, the ends of the reel-wires being held by the clamping-wedges and extending therefrom direct to the needle-rollers 49, as shown in Fig. 5. Just prior to the completion of said loop and the second cutting operation wheel 30 enters portion 28 of the cam-groove, and, following the latter, operates the rock-frame from the position shown in full lines, Figs. 1, 4, and 6, to the position shown in dotted lines, Fig. 5, said last-named figure also showing one of the casings 33 in full lines in the position it has attained by the time said loop is completely formed. In such operation of the rock-frame the outward movement of its casings 33 causes their horns or noses 34 to act like wedges between said diverging portions of the wires, so as to eventually dispose the latter substantially parallel and above and below the flanges 19, (see Fig. 10,) forcing those portions of the wires against which the substantially vertical portions of the casings bear to a position approximately parallel with the free ends of the loops, (extending from the notched disks,) so that as the horned casings attain the position shown in dotted lines, Fig. 5, the resistance offered by the looped wires results in the latter (as freed by the severance of the wires by the knives or cutters, as explained) slipping through the entrance-slots 36 of said casings and into the radial slots 38 of twisting-wheels 37, which begin to rotate at the instant this disposition of the loops is effected, this operation being imparted to said wheels through the engagement of the teeth 24 of wheel 25 with cog-wheel 23. This revolution of the twisting-wheels results in twisting the looped portions of the wires together in substantially the manner shown in Figs. 10 and 13, and immediately said operation is completed portion 29 of the cam acts to return casings 33 to their original positions, this action resulting in withdrawing the slotted twisting-wheels from engagement with the twisted ends of the wires because the latter are prevented from following up the casings by engagement with the flanges 19, which project outwardly beyond and intersect the center of said twisting-wheels when the latter occupy the positions shown in Fig. 5. At the instant the twisted or knotted wire is freed by the returning casings 33 it follows up said casings under the expansive action of the bale, the plunger of course having made its recoil movement in the interim and gliding over the horns or noses of said casings slips through the contiguous openings 12 of the plate 7 and the registering openings 6 of the baling-case and snugly embraces the contiguous corner of the bale in the customary manner—that is to say, the linked or looped portions at the opposite ends of the wires coincide with the corner of the bale and their twisted portions lie against the contiguous end and side. Just what the relation is, however, is unimportant as regards this invention. The operation of the needles, as will be readily understood, is continuous, remaining stationary at the ends of their advance and the end of their withdrawal movements momentarily only, and just prior to and during the former period of inaction the twisting and cutting operations take place. At about the same time that the wires are severed the needles begin their return movements by the engagement of rollers 30 with portions 29 of the cam-groove of wheel 25, and at the same time the cam 104 of shaft 26 throws dog 101 (see Fig. 5) out of the path of frame 53 and permits spring 55 to swing said frame back to its original position, and thus withdraw from the reels a charge of wire for partially girding the next bale, the balance of the wire being supplied by the reels as the bale is formed and after such formation by the advance of the needles preliminary to the knotting operation. This simultaneous return of the wire-holding and needle-carrying frames results in again disposing the parts as shown in Fig. 1, with the wires extending across the baling-chamber in the path of the next bale to be formed. By the time such parts attain the positions just mentioned the knotting operation is completed, and at the same instant cam 90 engages the advanced portion of and forces clutch member 93 rearward against the resistance of spring 99 until the clutch-rod extension 97 is disposed rearward of bearing-arm 83 and is thrown outwardly by spring 98 to a position at an angle to the rod, as shown in full lines Fig. 14, in which position by engagement with bearing 83 it holds the clutch-rod retracted until the next advance of the swinging frame 53. All future operations are repetitions of those described. It is apparent from the foregoing that the distance which frame 53 is permitted to swing rearward determines the size of the bale, this swinging action being regulated by adjusting stop 56 longitudinally.

From the above description it will be apparent that I have produced a band-tying mechanism for baling-presses which is entirely automatic in its action, which performs its function efficiently and reliably, which is strong and durable, and which is of comparatively simple, compact, and inexpensive construction, and while I have illustrated and described the preferred embodiment of the invention it will be understood that without departing from the essential spirit and scope or sacrificing any of the advantages of the invention it is susceptible of change as regards its form, proportion, detail, construction, and organization.

Having thus described the invention, what I claim as new, and desire to secure by Letters Patent, is—

1. In a machine of the character described, the combination of a reel, a needle-carrying frame, a slotted plunger through which the needle operates, and a frame, holding the end of the wire, at the opposite side of the baling-case from the needle-carrying frame and adapted to be advanced by the pressure of the bale against the wire between the needle and said wire-holding frame.

2. In a machine of the character described, the combination of a reel, a needle-carrying frame, a slotted plunger through which the needle operates, a frame, holding the end of the wire, at the opposite side of the baling-case from the needle-carrying frame and adapted to be advanced by the pressure of the bale against the wire between the needle and said wire-holding frame, means to sever the wire and knot the ends together around the bale, and means to withdraw the wire-holding frame.

3. In a machine of the character described, the combination of a reel, a needle-carrying frame, a slotted plunger through which the needle operates, a frame, holding the end of the wire, at the opposite side of the baling-case from the needle-carrying frame and adapted to be advanced by the pressure of the bale against the wire between the needle and said wire-holding frame, means to sever the wire contiguous to the point of the advanced needle, means, forming a part of the wire-holding frame, to grip or clamp and hold the wire between the point where it is cut and the point of the needle, and means to withdraw the needle and said wire-holding frame to their original positions preliminary to the formation of a new bale.

4. In a machine of the character described, the combination of a reel, a needle-carrying frame, a slotted plunger through which the needle operates, a frame, holding the end of the wire, at the opposite side of the baling-case from the needle-carrying frame and adapted to be advanced by the pressure of the bale against the wire between the needle and said wire-holding frame, means to sever the wire contiguous to the point of the advanced needle, means, forming a part of the wire-holding frame, to grip or clamp and hold the wire between the point where it is cut and the point of the needle, means to withdraw the needle and said wire-holding frame to their original positions preliminary to the formation of a new bale, and means to loop together the free ends of the wire around the bale.

5. In a machine of the character described, the combination of a reel, a needle-carrying frame, a slotted plunger through which the needle operates, a frame holding the end of the wire at the opposite side of the baling-case from the needle-carrying frame and adapted to be advanced by the pressure of the bale against the wire between the needle and said wire-holding frame, means to sever the wire contiguous to the point of the advanced needle, means, forming a part of the wire-holding frame, to grip or clamp and hold the wire between the point where it is cut and the point of the needle, means to withdraw the needle and said wire-holding frame to their original positions preliminary to the formation of a new bale, means to loop together the free ends of the wire around the bale.

6. In a machine of the character described, the combination of a reel, a needle-carrying frame, a slotted plunger through which the needle operates, a frame, holding the end of the wire, at the opposite side of the baling-case from the needle-carrying frame and adapted to be advanced by the pressure of the bale against the wire between the needle and said wire-holding frame, means to sever the wire contiguous to the point of the advanced needle, means, forming a part of the wire-holding frame, to grip or clamp and hold the wire between the point where it is cut and the point of the needle, means to withdraw the needle and said wire-holding frame to their original positions preliminary to the formation of a new bale, means to loop together the free ends of the wire around the bale, means to twist or knot together the looped ends of the wire, and means to effect the disengagement of the knotting mechanism from the knotted wire to permit the latter to be drawn into the case and tightly around the expanding bale.

7. In a machine of the character described, the combination of a reel, a needle-carrying frame, a slotted plunger through which the needle operates, a frame holding the end of the wire at the opposite side of the baling-case from the needle-carrying frame and adapted to be advanced by the pressure of the bale against the wire between the needle and said wire-holding frame, means to sever the wire contiguous to the point of the advanced needle, means, forming a part of the wire-holding frame, to grip or clamp and hold the wire between the point where it is cut and the point of the needle, means to withdraw the needle and said wire-holding frame to their original positions preliminary to the formation of a new bale, means to loop together the free ends of the wire around the bale, an oscillatory casing having an opening to receive the looped ends of the wire, means to swing said casing to effect the entrance of said looped ends into said opening, a slotted wheel to receive said looped ends as they enter the casing, means to rotate said wheel and twist or knot the ends of the wire together, and means to effect the disengagement of the knotting mechanism from the knotted wire to permit the latter to be drawn into the case and tightly around the expanding bale.

8. In a machine of the character described, the combination of a reel, a needle-carrying frame, a slotted plunger through which the needle operates, a frame holding the ends of the wire at the opposite side of the baling-case from the needle-carrying frame and adapted to be advanced by the pressure of the bale against the wire between the needle and said wire-holding frame, means to sever the wire contiguous to the point of the advanced needle, means, forming a part of the wire-holding frame, to grip or clamp and hold the wire between the point where it is cut and the point of the needle, means to withdraw the needle and said wire-holding frame to their original positions preliminary to the formation of a new bale, means to loop together the free ends of the wire around the bale, an oscillatory casing having an opening to receive the looped ends of the wire, means to swing said casing to effect the entrance of said looped ends into said opening, a slotted wheel to receive said looped ends as they enter the casing, means to rotate said wheel and twist or knot said ends together, means to swing said frame back to its original position, and means to prevent the knotted ends of the wire following said frame and to deflect such knotted portion over the free end of said frame and into the baling-case as the wire is withdrawn into the case by the expansive action of the bale.

9. In a machine of the character described, a baling-case having an opening through which the ends of the wire around the bale extend, an arm projecting outwardly from the case near said opening and provided with a slot registering with the latter and with flanges above and below said slot to hold said portions of the wire apart, an oscillatory casing projecting forwardly through said slot and provided with an opening in its front side and terminating in a horn forward of said opening, means to loop the ends of the wire together outward of said casing and opposite its opening, a wheel in said casing provided with a slot adapted to register with said opening, means to swing said casing forward and cause said slot to engage the looped ends of the wire, means to rotate said wheel and twist said looped ends to the contiguous portions of the wire, and means to swing said casing to its original position so that the path of the slotted wheel shall intersect said flanges to cause the latter to effect the disengagement of the knotted portion of the wire from said wheel and casing and deflect it over the horned end of the latter and through said opening of the case.

10. In a machine of the character described, a baling-case, having an opening through which the ends of the wire around the bale extend, an arm projecting outwardly from the case near said opening and provided with a slot registering with the latter and with flanges above and below said slot to hold said portions of the wire apart, an oscillatory casing projecting forwardly through said slot and provided with an opening in its front side and terminating in a horn forward of said opening, means to loop the ends of the wire together outward of said casing and opposite said opening, a wheel in said casing, provided with a slot adapted to register with said opening, an intermittently-driven wheel, gearing between the same and said casing, to swing the latter outward in each revolution of said wheel and cause said slotted wheel to engage the looped ends of the wire, means for rotating said slotted wheel while it is engaged with the wire to knot the ends together, and means, in the same revolution of said driven wheel, to swing said casing inward to its original position and cause said flanges to withdraw the knotted wire from the slotted wheel and deflect it through the opening of the baling-case into the latter.

11. In a machine of the character described, a baling-case, having an opening through which the ends of the wire around the bale extend, an arm projecting outwardly from the case near said opening and provided with a slot registering with the latter, and with flanges above and below said slot to hold said portions of the wire apart, an oscillatory casing projecting forwardly through said slot and provided with an opening in its front side and terminating in a horn forward of said opening, means to loop the ends of the wire together outward of said casing and opposite said opening, a wheel in the casing provided with a slot adapted to register with said opening, an intermittently-driven wheel, gearing between the same and said casing, to swing the latter outward in each revolution of said wheel and cause said slotted wheel to engage the looped ends of the wire, gearing between the driven wheel and the slotted wheel to rotate the latter while the casing occupies such outward position, and means, in the same revolution of said driven wheel, to swing said casing inward to its original position and cause said flanges to withdraw the knotted wire from the wheel and casing and deflect it through the opening of the baling-case into the latter.

12. In a machine of the character described, a frame having arms forming a circular opening with a mouth, a shaft journaled in said frame and provided with a disk in said circular opening having peripheral notches, one of which registers with said mouth, a pair of disks rigid on said shaft and provided with peripheral teeth and forming between them an annular space wedge shape in cross-section, a knife between said disks and the notched disk and adapted to shear the wire against the former, and a wedge-clamp engaging said wedge-shaped space between the toothed disks.

13. In a machine of the character described, a frame having arms forming a circular opening with a mouth, a shaft journaled in said frame and provided with a disk in said circular opening having peripheral notches one of which registers with said mouth, a pair of disks rigid on said shaft and provided with peripheral teeth and forming between them an annular space wedge shape in cross-section, a knife between said disks and the notched disk and adapted to shear the wire against the former, a wedge-clamp engaging said wedge-shaped space between the toothed disks to clamp the end of the wire between said disks at the opposite side of the shaft from the mouth, and a needle at the opposite side of the baling-case and holding the wire in the notch of said disk registering with said mouth and in advance of teeth of the pair of disks.

14. In a machine of the character described, a frame having arms forming a circular opening with a mouth, a shaft journaled in said frame and provided with a disk in said circular opening, having peripheral notches one of which registers with said mouth, a pair of disks rigid on said shaft and provided with peripheral teeth and forming between them an annular space wedge shape in cross-section, a knife between said disks and the notched disk and adapted to shear the wire against the former, a wedge-clamp engaging said wedge-shaped space between the toothed disks to clamp the end of the wire between said disks at the opposite side of the shaft from the mouth, a needle at the opposite side of the baling-case and holding the wire in the notch of said disk registering with said mouth and in advance of teeth of the pair of disks, a plunger to form a bale against the wire where it extends from the needle to said clamping-wedge, means to rotate said notched disk a half-revolution and press the wire against the knife, means to cause the needle to cross through the baling-chamber at the rear end of the bale and insert the wire through said mouth into a notch of said disk diametrically opposite the first-named notch, means for continuing the rotation of said notched disk to sever the wire near its end, and to cause the other portion of the wire extending between the other notch of the disk and the point of the needle to be clamped by said wedge between the toothed disks and then severed by the knife, and at the same time loop the ends of the wire together between said notched disk and the case.

15. In a machine of the character described, a frame having arms forming a circular opening with a mouth, a shaft journaled in said frame and provided with a disk in said circular opening having peripheral notches one of which registers with said mouth, a pair of disks rigid on said shaft and provided with peripheral teeth and forming between them an annular space wedge shape in cross-section, a knife between said disks and the notched disks and adapted to shear the wire against the former, a wedge-clamp engaging said wedge-shaped space between the toothed disks and clamp the end of the wire between said disks at the opposite side of the shaft from the mouth, a needle at the opposite side of the baling-case and holding the wire in the notch of said disk registering with said mouth and in advance of the teeth of the pair of disks, a plunger to form a bale against the wire where it extends from the needle to said clamping-wedge, means to rotate the notched disk a half-revolution and press the wire against the knife, means to swing the needle transversely through the baling-chamber across the rear end of the bale and through said mouth into a notch of said disk diametrically opposite the first-named notch, means for continuing the rotation of said notched disk to sever the wire near its end, and to cause the other portion of the wire extending between the other notch of the disk and the point of the needle to be clamped by said wedge between the toothed disks and then severed by the knife, and at the same time loop the ends of the wire together between said notched disk and the case, means to lock the shaft-carrying frame in its advanced position until the loop is formed, means to release said frame and means to return the needle to its original position.

16. In a machine of the character described, a frame having arms forming a circular opening with a mouth, a shaft journaled in said frame and provided with a disk in said circular opening, having peripheral notches one of which registers with said mouth, a pair of disks rigid on said shaft and provided with peripheral teeth and forming between them an annular space wedge-shape in cross-section, a knife between said disks and the notched disks, a wedge-clamp engaging said wedge-shaped space between the toothed disks to clamp the end of the wire between said disks at the opposite side of the shaft from the mouth, a needle at the opposite side of the baling-case and holding the wire in the notch of said disk registering with said mouth and in advance of teeth of the pair of disks, a plunger to form a bale against the wire where it extends from the needle to said clamping-wedge, means to rotate the notched disk a half-revolution and press the wire against the knife, means to swing the needle transversely through the baling-chamber across the rear end of the bale and through said mouth into a notch of said disk diametrically opposite the first-named notch, means for continuing the rotation of said notch-disk to sever the wire near its end, and to cause the other portion of the wire extending between the other notch of the disk and the point of the needle to be clamped by said wedge between the toothed disks and then severed by the knife, and at the same time loop the ends of the wire together between said notched disk and the case, means to lock the shaft-carrying frame in its advanced position until the loop is formed, means to release said frame, means to return the needle to its original position, and means to swing the said frame away from the loop as the needle withdraws and to draw the wire forwardly through the latter.

17. In a machine of the character described, a frame having arms forming a circular opening with a mouth, a shaft journaled in said frame and provided with a disk in said circular opening having peripheral notches one of which registers with said mouth, a pair of disks rigid on said shaft and provided with peripheral teeth and forming between them an annular space wedge-shaped in cross-section, a wedge-clamp engaging said wedge-shaped space between the toothed disks to clamp the end of the wire between said disks at the opposite side of the shaft from said mouth, a needle at the opposite side of the baling-case and holding the wire in the notch of said disk registering with said mouth and in advance of teeth of the pair of disks, a plunger to form a bale against the wire where it extends from the needle to said clamping-wedge, means to rotate the notched disk a half-revolution and press the wire against the knife, means to swing the needle transversely through the baling-chamber across the rear end of the bale and through said mouth into a notch of said disk diametrically opposite the first-named notch, means for continuing the rotation of said notched disk to sever the wire near its end, and to cause the other portion of the wire extending between the other notch of the disk and the point of the needle to be clamped by said wedge between the toothed disks and then severed by the knife, and at the same time loop the ends of the wire together between said notched disk and the case, a spring-actuated dog to lock the shaft-carrying frame in its advanced position until the loop is formed, means to trip said dog, and means to return the needle to its original position.

18. In a machine of the character described, a baling-case provided with openings at its opposite sides, a needle at one side of the case, and a frame at the opposite side of the case to hold the end of the wire extending around the front end and sides of the bale and through the opening in the proximate side of the case, a horizontally-slotted arm projecting outwardly from the same side of the case, in the plane of said opening, and provided with flanges at opposite sides of said slot, one of which holds that portion of the wire extending from the proximate opening to said wire-holding frame, at one side of the slot, a frame terminating in a horn to deflect said wire against said flange, means to swing the needle across the case through said case-openings until its point has carried the contiguous portion of the wire across the rear end of the bale and through the said proximate opening, means to deflect that portion of the wire extending from said proximate opening to the point of the needle, against the flange at the opposite side of the slot of said arm, a wire-looping device forming a part of the wire-holding frame and adapted to loop the secured end of the wire to that portion extending from the front end of the needle, means to successively sever the looped ends of the wire between the point of the needle and said looping mechanism and to grip and hold the wire between the point of the needle and the point of severance, a slotted rotatable wheel carried by the horned frame, means to swing said frame toward the looping mechanism and cause the slot of said wheel to engage the loop, means to operate said wheel and twist or knot the ends of the loop to the contiguous portions of the wire, means to return said horned frame to its original position, and means to disengage the looped ends of the wire from said wheel and deflect them over the horn of said retracted frame to enable the expanding bale to withdraw them through said proximate opening.

19. In a machine of the character described, the combination of wire-carrying reel, a needle receiving said wire, a frame holding the end of the wire at the opposite side of the case from the reel, and means to operate said frame and thereby draw wire through the needle for engagement by the bale.

20. In a machine of the character described, the combination of a wire-carrying reel, a needle receiving said wire, a frame holding the end of the wire at the opposite side of the case from the reel, means to operate said frame and thereby draw wire through the needle for engagement by the bale, and an adjustable stop to limit such movement of the frame.

21. In a machine of the character described, the combination of a wire-carrying reel, a needle receiving said wire, a frame holding the end of the wire at the opposite side of the case from the reel, and means for yieldingly operating said frame and thereby drawing wire through the needle to gird the bale.

22. In a machine of the character described, the combination of a wire-carrying reel, a needle receiving said wire, a frame holding the end of the wire at the opposite side of the case from the reel, means for yieldingly operating said frame and thereby drawing wire through the needle to gird the bale, and an adjustable stop to limit such movement of the frame.

23. In a machine of the character described, a wire-carrying reel, a frame provided with a clamping mechanism holding the end of the wire partially girding a bale, a needle through which the wire is threaded between the bale and reel, means to cause the needle to swing across the baling-case and draw wire from the reel and across the rear end of the bale and dispose it contiguous to said clamping mechanism, a cutter, and means to successively cut the end of the wire near the clamping mechanism and then introduce that portion of the wire near the point of the needle into said clamping mechanism and cut it at the opposite side of the clamp from the needle.

24. In a machine of the character described, a wire-carrying reel, a frame provided with a clamping mechanism holding the end of the wire partially girding a bale, a needle through which the wire is threaded between the bale and reel, means to cause the needle to swing across the baling-case and draw wire from the reel and across the rear end of the bale and dispose it contiguous to said clamping mechanism, a cutter, means to successively cut the end of the wire near the clamping mechanism and then introduce that portion of the wire near the point of the needle into said clamping mechanism and cut it at the opposite side of the clamp from the needle, and means to loop together the ends of the wire girding the bale.

25. In a machine of the character described, a wire-carrying reel, a frame provided with a clamping mechanism holding the end of the wire partially girding a bale, a needle through which the wire is threaded between the bale and reel, means to cause the needle to swing across the rear end of the bale and dispose it contiguous to said clamping mechanism, a cutter, means to successively cut the end of the wire near the clamping mechanism and then introduce that portion of the wire near the point of the needle into said clamping mechanism and cut it at the opposite side of the clamp from the needle, means to loop together the ends of the wire girding the bale, and means to knot said looped ends together.

26. In a machine of the character described, a baling-case having openings in its side walls, a reel at one side and a yieldingly-repressed frame at the other side holding the opposite end of the wire which extends transversely of and through the openings of the baling-case, a needle engaging the wire between the reel and case, and a plunger to form a bale against the transverse portion of the wire.

27. In a machine of the character described, a baling-case having openings in its side walls, a reel at one side and a yieldingly-repressed frame at the other side holding the opposite ends of the wire which extends transversely of and through the openings of the baling-case, a needle engaging the wire between the reel and case, a plunger slotted in its front end and adapted to form a bale against the transverse portions of the wire and thereby advance said frame, and means to cause the needle to move transversely through the case and slotted plunger and thereby draw additional wire from the reel and dispose that portion formerly in the needle against the rear end of the bale.

28. In a machine of the character described, a baling-case having openings in its side walls, a reel at one side and a yieldingly-repressed frame at the other side holding the opposite ends of the wire which extends transversely of and through the openings of the baling-case, a needle engaging the wire between the reel and case, a plunger slotted in its front end and adapted to form a bale against the transverse portions of the wire and thereby advance said frame, means to cause the needle to move transversely through the case and slotted plunger and thereby draw additional wire from the reel and dispose that portion formerly in the needle against the rear end of the bale, means to lock the frame thus advanced, means to sever the wire and knot the ends of that extending around the bale, and clamp to said frame the end of the wire extending from the point of the needle, and means as such operations are performed to trip said locking mechanism.

29. In a machine of the character described, a frame, a shaft therein, a pair of toothed disks rigid on said shaft and forming a space between them wedge shape in cross-section, a wedge-clamp to hold the end of the wire tightly in said space, a knife against one of said disks, and means to rotate said disks and thereby draw and sever the wire against the knife, and instantly withdraw the severed end from engagement with said wedge-clamp.

30. In a machine of the character described, a frame, a shaft therein, a pair of toothed disks rigid on said shaft and forming a space between them wedge shape in cross-section, a wedge-clamp to hold the end of the wire tightly in said space, a knife against one of said disks, a needle to dispose another portion of the wire against said toothed disks diametrically opposite from the first-named portion, and means to rotate said shaft and cause said toothed disks to draw the portion of the wire disposed thereagainst by the needle, into engagement with the clamp and at the same time cause the first-named portion of the wire to be cut by the knife and the severed or loose end to be freed from the clamp.

31. In a machine of the character described, a frame, a shaft therein, a pair of toothed disks rigid on said shaft and forming a space between them wedge shape in cross-section, a wedge-clamp to hold the end of the wire tightly in said space, a knife against one of said disks, a needle to dispose another portion of the wire against said toothed disks diametrically opposite from the first-named portion, means to rotate said shaft and cause said toothed disks to draw the portion of the wire disposed thereagainst by the needle into engagement with the clamp and at the same time cause the first-named portion of the wire to be cut by the knife and the severed or loose end to be freed from the clamp, and means for looping together the ends of that portion of the wire at the opposite side of the knife from the disks.

32. In a machine of the character described, a frame, a shaft therein, a pair of toothed disks rigid on said shaft and forming a space between them wedge shape in cross-section, a wedge-clamp to hold the end of the wire tightly in said space, a knife against one of said disks, a needle to dispose another portion of the wire against said toothed disks diametrically opposite from the first-named portion, means to rotate said shaft and cause said toothed disks to draw the portion of the wire disposed thereagainst by the needle into engagement with the clamp and at the same time cause the first-named portion of the wire to be cut by the knife and the severed or loose end to be freed from the clamp, means operated by said shaft for looping together the ends of that portion of the wire at the opposite side of the knife from the disks, and means to knot said looped ends together.

33. In a machine of the character described, a frame having arms forming a circular opening with a mouth, a shaft journaled in said frame and provided with a disk having diametrically opposite peripheral notches engaging the ends of the wire extending around the bale, means holding said wires apart between said disk and the baling-case, and means to rotate said shaft and thereby loop said ends of the wire together between the disk and case.

34. In a machine of the character described, a frame having arms forming a circular opening with a mouth, a shaft journaled in said frame and provided with a disk having diametrically opposite peripheral notches engaging the ends of the wire extending around the bale, means holding said wire apart between said disk and the baling-case, means to rotate said shaft and thereby loop said ends of the wire together between the disk and case, and means to knot the looped ends of the wire together.

35. In a machine of the character described, a frame having arms forming a circular opening and with a mouth, a shaft journaled in said frame and provided with a disk having diametrically opposite peripheral notches engaging the ends of the wire extending around the bale, means holding said wires apart between said disk and the baling-case, means to rotate said shaft and thereby loop said ends of the wire together between the disk and case, and means to twist the free ends of the loops around the contiguous portions of the wire.

36. In a machine of the character described, a reel, a frame at the opposite side of the case from the reel to hold the extreme end of the wire and provided with a looping mechanism, a driven mechanism, gearing, and means actuated by said frame for causing the driven mechanism to operate said gearing and the latter to operate the looping mechanism and loop together the ends of the wire extending around the bale.

37. In a machine of the character described, a reel, a needle for the wire, a frame at the opposite side of the case from the needle and holding the extreme end of the wire, a slotted plunger to cause the forming bale to press against the wire and advance said frame, a driven mechanism, gearing, and means, actuated by the advancing frame, for causing the driven mechanism to operate said gearing and cause the needle to draw the wire across the rear end of the bale.

38. In a machine of the character described, a reel, a frame at the opposite side of the case from the reel to hold the extreme end of the wire and provided with a looping mechanism, a driven mechanism, gearing, means actuated by said frame for causing the driven mechanism to operate said gearing and the latter to operate the looping mechanism and loop together the ends of the wire extending around the bale, and means for knotting the looped ends of the wire together.

In testimony whereof I affix my signature in the presence of two witnesses.

JESSE L. TOWNER.

Witnesses:
H. C. RODGERS,
G. Y. THORPE.